US012808786B2

(12) United States Patent
Chang et al.

(10) Patent No.: US 12,808,786 B2
(45) Date of Patent: Nov. 24, 2026

(54) DETECTING SYSTEM USING SPECTRUM MEASUREMENT DEVICE

(71) Applicant: InnoSpectra Corporation, Hsin-Chu (TW)

(72) Inventors: Fei-Peng Chang, Hsinchu County (TW); Kuo-Sheng Huang, Hsinchu County (TW); Cheng-Hsiung Chen, Hsinchu County (TW); Hsi-Pin Li, Hsinchu County (TW)

(73) Assignee: InnoSpectra Corporation, Hsin-Chu (TW)

( * ) Notice: Subject to any disclaimer, the term of this patent is extended or adjusted under 35 U.S.C. 154(b) by 120 days.

(21) Appl. No.: 18/581,378

(22) Filed: Feb. 20, 2024

(65) Prior Publication Data

US 2024/0319079 A1 Sep. 26, 2024

(30) Foreign Application Priority Data

Mar. 24, 2023 (CN) ......................... 202310296452.8

(51) Int. Cl.
*G01N 21/25* (2006.01)
*G01N 21/27* (2006.01)

(52) U.S. Cl.
CPC ........... *G01N 21/255* (2013.01); *G01N 21/27* (2013.01); *G01N 2201/0637* (2013.01);
(Continued)

(58) Field of Classification Search
CPC ...... G01N 21/255; G01N 21/27; G01N 21/25; G01N 21/01; G01N 2201/0637;
(Continued)

(56) References Cited

U.S. PATENT DOCUMENTS

2015/0051498 A1* 2/2015 Darty .................... G01J 3/2803 600/407
2016/0327906 A1* 11/2016 Futterer ............... G03H 1/2294
(Continued)

FOREIGN PATENT DOCUMENTS

CN 108738344 11/2018
CN 215598988 1/2022

OTHER PUBLICATIONS (CN215598988U), with page numbers (Year: 2022).*

*Primary Examiner* — Tarifur R Chowdhury
*Assistant Examiner* — Carlos Perez-Guzman
(74) *Attorney, Agent, or Firm* — JCIPRNET

(57) ABSTRACT

A detecting system using a spectrum measurement device and detecting an object is provided. The system includes: a sampling module and spectrum measurement devices assembled to the sampling module. The sampling module provides an illumination beam to the object and collects measurement beams reflected by the object to the spectrum measurement devices. The illumination beam has an illumination light waveband. The measurement beams have the illumination light waveband. The spectrum measurement devices include first and second spectrum measurement devices. The first spectrum measurement device includes a digital micromirror device. The measurement beams include first and second measurement beams transmitted to the first and second spectrum measurement devices respectively. The first spectrum measurement device detects a portion of the illumination light waveband of the first measurement beam, and at the same time the second spectrum measurement device detects another portion of the illumination light waveband of the second measurement beam.

18 Claims, 5 Drawing Sheets

(52) U.S. Cl.
CPC ................ *G01N 2201/0638* (2013.01); *G01N 2201/0664* (2013.01); *G01N 2201/0668* (2013.01); *G01N 2201/08* (2013.01)

(58) Field of Classification Search
CPC ... G01N 2201/0638; G01N 2201/0664; G01N 2201/0668; G01N 2201/08; G01J 3/021; G01J 3/0218; G01J 3/0221; G01J 3/36; G01J 3/42
See application file for complete search history.

(56) References Cited

U.S. PATENT DOCUMENTS

| | | | | |
|---|---|---|---|---|
| 2017/0082487 | A1* | 3/2017 | Wieners .................. | G01J 3/021 |
| 2022/0071521 | A1* | 3/2022 | Matsuura ............. | A61B 5/0075 |
| 2023/0341263 | A1* | 10/2023 | Endo ...................... | G02B 27/42 |

* cited by examiner

DETECTING SYSTEM USING SPECTRUM MEASUREMENT DEVICE

CROSS-REFERENCE TO RELATED APPLICATION

This application claims the priority benefit of China application serial no. 202310296452.8 filed on Mar. 24, 2023. The entirety of the above-mentioned patent application is hereby incorporated by reference herein and made a part of this specification.

BACKGROUND OF THE INVENTION

Field of the Invention

The invention relates to a detecting system using a spectrum measurement device.

Description of Related Art

Spectrometers are widely used to measure the properties of various materials. When using a spectrometer to sample the spectrum of an object, it is necessary to irradiate the object with strong light. In order to obtain a spectrum having a wide wavelength range, it is often necessary to irradiate a high-energy beam for a long time, which may cause the sample to deteriorate due to high temperature and affect measurement results. Therefore, there is a need for a detecting device that may rapidly measure the spectrum of a large-area object over a wide wavelength range.

The "prior art" paragraphs are only used to help understand the content of the invention. Therefore, the content disclosed in the "prior art" paragraphs may contain some conventional techniques that do not constitute common knowledge to those having ordinary skill in the art. The content disclosed in the "prior art" paragraphs does not mean that the content or the issues to be solved by one or a plurality of embodiments of the invention have been known or recognized by those having ordinary skill in the art before the application of the invention.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a detecting system using a spectrum measurement device and configured to rapidly detect a spectrum in a large wavelength range.

Other objects and advantages of the invention may be further understood from the technical features disclosed in the invention.

In order to achieve one, part, or all of the above objects or other objects, the invention provides a detecting system using a spectrum measurement device and configured to detect an object. The detecting system includes: a sampling module and at least two spectrum measurement devices assembled to the sampling module, wherein the sampling module is configured to provide an illumination beam to the object and to collect at least two measurement beams reflected by the object to the at least two spectrum measurement devices, wherein the illumination beam has an illumination light waveband, and the at least two measurement beams have the illumination light waveband; the at least two spectrum measurement devices include a first spectrum measurement device and a second spectrum measurement device, the first spectrum measurement device includes a digital micromirror device, and the at least two measurement beams include a first measurement beam transmitted to the first spectrum measurement device and a second measurement beam transmitted to the second spectrum measurement device, wherein the first spectrum measurement device is configured to detect a portion of the illumination light waveband of the first measurement beam, and at the same time the second spectrum measurement device is configured to detect another portion of the illumination light waveband of the second measurement beam.

Several exemplary embodiments accompanied with figures are described in detail below to further describe the disclosure in details.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The above and other technical contents, features, and effects of the invention will be clearly presented in the following detailed description of a preferred embodiment with reference to the drawings. Directional terms mentioned in the following embodiments, such as up, down, left, right, front, or back, etc., are only for reference to the directions in the attached drawings. Accordingly, the directional terms used are illustrative, not limiting, of the invention.

Figure 1A:
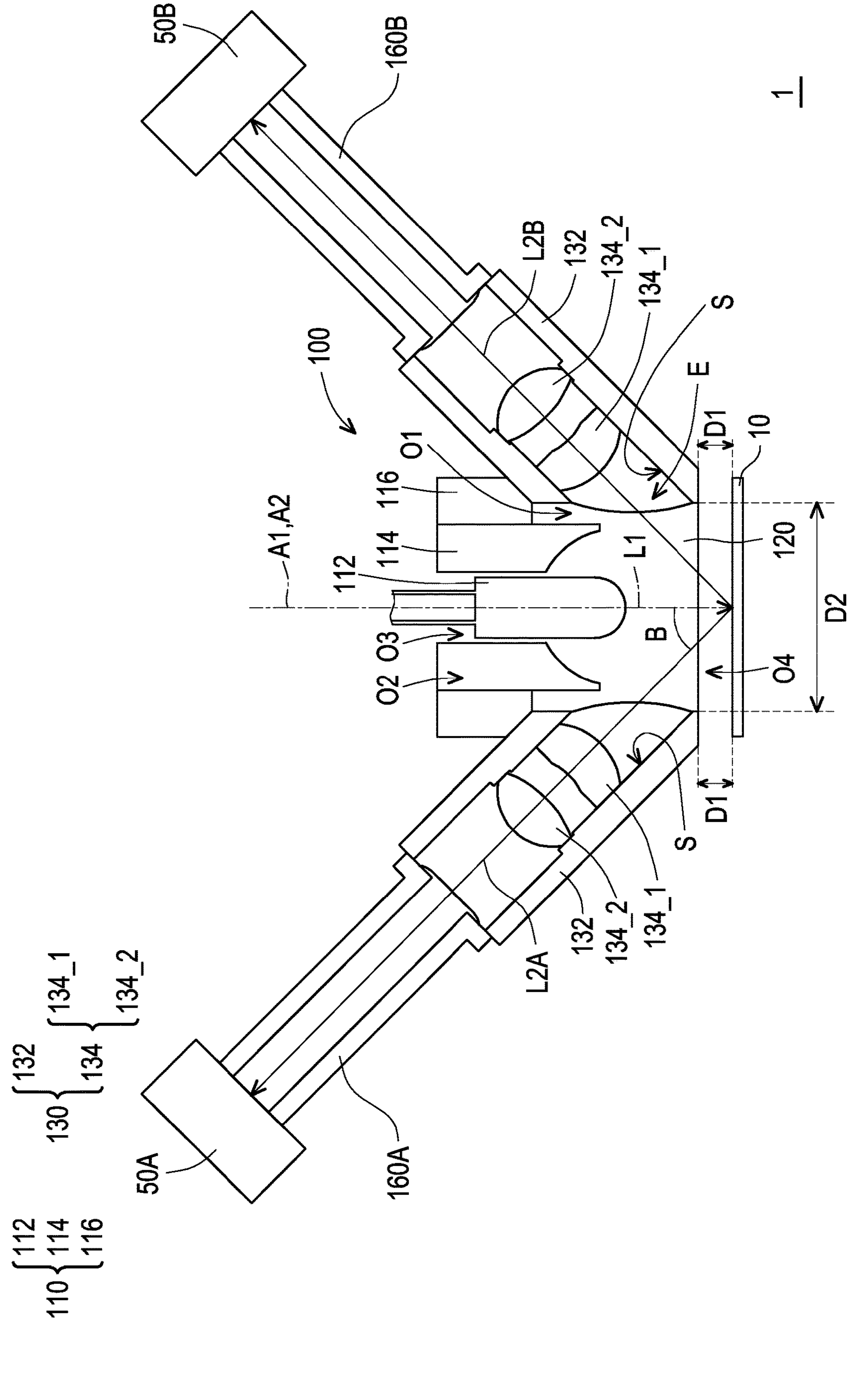
FIG. 1A is a cross-sectional view of a detecting system using a spectrum measurement device according to an embodiment of the invention.

FIG. 1A is a cross-sectional view of a detecting system using a spectrum measurement device according to an embodiment of the invention. As shown in FIG. 1A, a detecting system 1 is configured to detect an object 10 to be measured. The detecting system 1 includes a sampling module 100 and at least two spectrum measurement devices 50A and 50B assembled to the sampling module 100.

In the present embodiment, the sampling module 100 is a non-contact diffuse reflection sampling module. The sampling module 100 is configured to provide an illumination beam L1 to the object 10 to be measured and collect at least two measurement beams L2A and L2B reflected by the object 10 to be measured to the corresponding at least two spectrum measurement devices 50A and 50B respectively. The measurement beam L2A and the measurement beam L2B carry characteristics of the object 10 to be measured. In particular, the illumination beam L1 has an illumination light waveband, and each of the at least two measurement beams L2A and L2B has the illumination light waveband. In some embodiments, the wavelength range of the illumination light waveband is 900 nm to 2400 nm, but is not limited thereto.

In addition, a distance D1 between the sampling module 100 and the object 10 to be measured is greater than 0 mm. In other words, the sampling module 100 provided by the present embodiment is a non-contact device. In a preferred embodiment, the distance D1 between the sampling module 100 and the object 10 to be measured is greater than or equal to 5 mm.

As shown in FIG. 1A, the sampling module 100 includes at least one illumination module 110, a light collecting element 120, and at least two light receiving modules 130.

The illumination module 110 is configured to provide the illumination beam L1 to the object 10 to be measured. In the present embodiment, the number of the illumination module 110 is one, but the disclosure is not limited thereto.

The light collecting element 120 has a first opening O1 and an internal space E. The illumination module 110 is disposed in the first opening O1 of the light collecting element 120, and the illumination beam L1 emitted by the illumination module 110 is transmitted to the object 10 to be measured in the internal space E of the light collecting element 120.

Specifically, the illumination module 110 includes a light-emitting element 112, a cup-shaped reflector 114, and a base 116.

The light-emitting element 112 is configured to provide the illumination beam L1. In the present embodiment, the light-emitting element 112 is, for example, a tungsten lamp or a solid-state light source, wherein the solid-state light source includes light-emitting diode (LED) or laser diode (LD), etc., and the disclosure is not limited thereto. The wavelength of the illumination beam L1 may be between 400 nanometers (nm) and 2500 nanometers (nm), but the disclosure is not limited thereto.

The base 116 of the illumination module 110 is disposed at the top of the light collecting element 120. The base 116 has a second opening O2. The cup-shaped reflector 114 is disposed in the second opening O2 of the base 116. The cup-shaped reflector 114 has a third opening O3. The light-emitting element 112 is disposed in the third opening O3 of the cup-shaped reflector 114.

Therefore, since the illumination beam L1 emitted by the light-emitting element 112 may be emitted in any direction, via the reflection and guiding effect of the cup-shaped reflector 114, the cup-shaped reflector 114 has a reflective curved surface (not labeled) facing the object 10 to be measured, the large-angle light emitted by the light-emitting element 112 may be reflected by the reflective curved surface of the cup-shaped reflector 114 and be concentrated on the object 10 to be measured, and improving the efficiency of the light-emitting element 112 may improve the illumination directivity of the illumination beam L1. In the present embodiment, an optical axis A1 of the light-emitting element 112 is coaxial with a central axis A2 of the cup-shaped reflector 114 to achieve precise assembly, but the invention is not limited thereto.

In another embodiment, the number of the illumination module 110 may be a plurality. Specifically, a combination of a plurality of light-emitting elements 112, the cup-shaped reflector 114, and the base 116 may be disposed at the top (first opening) of the light collecting element 120. Alternatively, a combination of a plurality of light-emitting elements 112 and the cup-shaped reflector 114 may be disposed in one base 116, and the base 116 is disposed at the top (first opening) of the light-collecting element 120. Thereby, the illumination intensity or uniformity of the illumination beam L1 may be further enhanced. In another different embodiment, the light-emitting elements 112 may be selected as a light source providing beams of different wavelengths to facilitate measurement of different bands, but the invention is not limited thereto.

The light collecting element 120 is a hollow cylindrical shell, and the top thereof is connected to the base 116 of the illumination module 110. In the present embodiment, the light-emitting elements 112 are located inside the cup-shaped reflector 114, and the cup-shaped reflector 114 is located inside the light collecting element 120. Therefore, the light-emitting elements 112 and the cup-shaped reflector 114 may have better positions to produce optimal lighting effects. In addition, the inner wall of the light collecting element 120 (hollow cylindrical shell) is a smooth reflective surface, so the usage efficiency of the illumination beam L1 may be improved. The light collecting element 120 has a light outlet O4 opposite to the first opening O1. That is, the first opening O1 and the light outlet O4 are respectively located at two opposite sides of the hollow cylindrical shell and are connected to each other. A diameter D2 of the light outlet O4 is, for example, less than 25 mm. In the present embodiment, the diameter of the light collecting element 120 is, for example, 16 mm, and the distance D1 between the light collecting element 120 and the object 10 to be measured is, for example, 8 mm. Therefore, the sampling range of the sampling module 100 may be increased.

The light receiving module 130 is connected to the light collecting element 120. The number of the light receiving module 130 is the same as the number of the spectrum measurement device. In the embodiment of FIG. 1, if the detecting system 1 is provided with two spectrum measurement devices 50A and 50B, then there are two corresponding light receiving modules 130, wherein the light receiving modules 130 are configured to introduce the first measurement beam L2A and the second measurement beam L2B from the object 10 to be measured into the first spectrum measurement device 50A and the second spectrum measurement device 50B respectively. For example, in other embodiments, the number of the light receiving module 130 and the number of the spectrum measurement device may be greater than two, and the disclosure is not limited thereto.

Each light receiving module 130 includes a housing 132 and a lens element group 134 disposed in the housing 132. In the present embodiment, the first measurement beam L2A is transmitted from the object 10 to be measured via the lens element group 134 of the light receiving module 130 via the corresponding path thereof to enter the first spectrum measurement device 50A, and the second measurement beam L2B is transmitted from the object 10 to be measured via the lens element group 134 of the light receiving module 130 on the corresponding path thereof to enter the second spectrum measurement device 50B.

An inner wall S of the housing 132 of the light receiving modules 130 is a light-absorbing surface, and the absorbance is greater than or equal to 2. Therefore, when the first measurement beam L2A and the second measurement beam L2B are transmitted from the object 10 to be measured into the respective corresponding light receiving modules 130, the inner wall of the housing 132 may absorb stray light to prevent stray light from entering the first spectrum measurement device 50A and the second spectrum measurement device 50B.

Each of the lens element groups 134 includes a first lens element 134_1 and a second lens element 134_2. The first lens element 134_1 is located between the second lens element 134_2 and the light collecting element 120. In the present embodiment, the first lens element 134_1 is a meniscus lens element, and the second lens element 134_2 is a biconvex lens element. In the present embodiment, the acceptable wavelength range of the first lens element 134_1 and the second lens element 134_2 is between 400 nm and 2500 nm.

In addition, in the present embodiment, the light receiving modules 130 are connected to the light collecting element 120. In the present embodiment, the light collecting element 120 and the housing 132 of the light receiving modules 130 are integrally formed, but the invention is not limited thereto. There is an angle B between the direction of the optical axis of the lens element group 134 of the light receiving modules 130 (i.e., the extension direction of the housing 132) and the extension direction of the central connecting line between the first opening O1 and the light outlet O4 of the light collecting element 120 (parallel to the optical axis A1), and the angle B is greater than or equal to 25 degrees and less than or equal to 65 degrees. In the present embodiment, the angle B is 45 degrees.

The detecting system 1 includes at least two spectrum measurement devices. In some embodiments, the number of the spectrum measurement device is a plurality, corresponding to a plurality of received measurement beams. A plurality of spectrum measurement devices are configured to respectively receive a plurality of measurement beams, and the spectrum measurement devices may simultaneously detect different portions in the illumination light waveband of the correspondingly received measurement beams. In addition, in the present embodiment, the plurality of spectrum measurement devices are symmetrically distributed on the sampling module. For example, in FIG. 1, the first spectrum measurement device 50A and the second spectrum measurement device 50B are symmetrically distributed left and right on the sampling module 100.

The first spectrum measurement device 50A and the second spectrum measurement device 50B may be configured in the same wavelength range or different wavelength ranges according to needs to simultaneously acquire a spectrum in a large wavelength range in a short time, such as a spectrum in the range of 900 nm to 2400 nm, or to rapidly acquire a spectrum in the same range, such as a spectrum in the range of 900 nm to 1650 nm, in order to reduce the time for the light source to irradiate the sample, and obtain the spectral information of the sample in a short time.

By using a plurality of spectrum measurement devices to simultaneously measure a plurality of measurement beams, the properties of the sample to be measured may be rapidly detected. In some embodiments, by appropriately selecting the measurement wavelength range of the spectrum measurement device, the detecting system 1 may cover the wavelength range from UV to visible light to near-infrared, becoming a detecting system with a selectable wavelength detection range, which may detect the properties of the object in an extremely wide wavelength range.

As shown in FIG. 1, in the present embodiment, the detecting system 1 includes the first spectrum measurement device 50A and the second spectrum measurement device 50B. The measurement beam reflected by the object 10 to be measured includes the first measurement beam L2A transmitted to the first spectrum measurement device 50A and the second measurement beam L2B transmitted to the second spectrum measurement device 50B.

In the present embodiment, the first spectrum measurement device 50A is configured to detect a portion of the illumination light waveband of the first measurement beam L2A, and at the same time the second spectrum measurement device 50B is configured to detect another portion of the illumination light waveband of the second measurement beam L2B. In particular, a portion of the illumination light waveband and another portion of the illumination light waveband are different wavebands or different wavelength values.

In the present embodiment, the first spectrum measurement device 50A includes a digital micromirror device (DMD) as a wavelength selector. Specifically, the digital micromirror device (DMD) may be a DLP2010NIR DMD chip from Texas Instruments, or one with similar functions, and the disclosure is not limited thereto.

In some embodiments, the first spectrum measurement device 50A and the second spectrum measurement device 50B may be different spectrum measurement devices. For example, the first spectrum measurement device 50A includes a digital micromirror device configured to detect a portion of the illumination light waveband of the first measurement beam L2A selected by the digital micromirror device, for example, detecting the wavelength range of 900 nm to 1650 nm. The second spectrum measurement device 50B is a spectrum detecting device having a different wavelength detection range from the first spectrum measurement device 50A, and is configured to detect another portion of the illumination light waveband of the second measurement beam L2B, such as configured to detect the wavelength range of 1650 nm to 2400 nm. Therefore, by simultaneously using the first spectrum measurement device 50A and the second spectrum measurement device 50B to respectively measure different wavelength ranges, the wavelength detection range of the detecting system 1 may be expanded, the scanning of a spectrum of 900 nm to 2400 nm may be accelerated, and the time for the sample to be irradiated by the light source may be reduced.

Figure 1B:
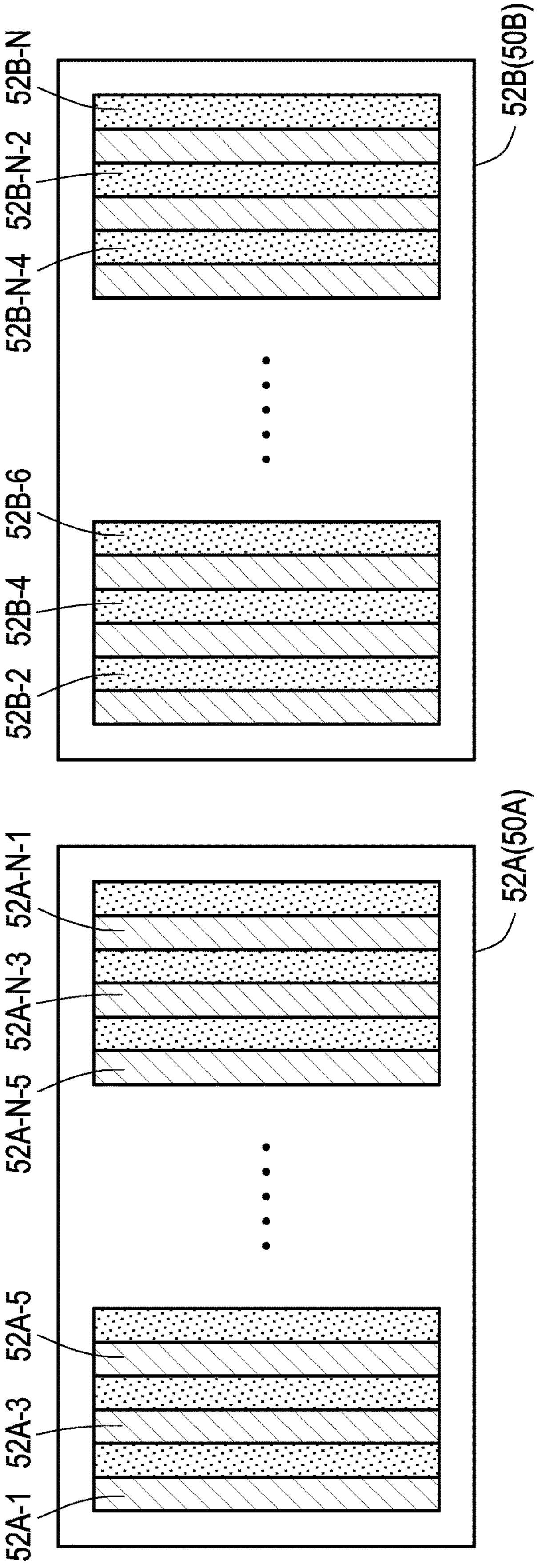
FIG. 1B is a schematic diagram of a wavelength selection embodiment of a digital micromirror device of the first spectrum measurement device and a digital micromirror device of the second spectrum measurement device in FIG. 1A.

FIG. 1B is a schematic diagram of a wavelength selection embodiment of a digital micromirror device of the first spectrum measurement device and a digital micromirror device of the second spectrum measurement device in FIG. 1A. As shown in FIG. 1A and FIG. 1B, in an embodiment, the first spectrum measurement device 50A and the second spectrum measurement device 50B may be the same spectrum measurement device. For example, the first spectrum measurement device 50A includes a digital micromirror device 52A configured to detect the wavelength range of 901 nm to 1650 nm. The second spectrum measurement device 50B includes the same digital micromirror device 52B as the first spectrum measurement device 50A to serve as a wavelength selector. The digital micromirror device 52B of the second spectrum measurement device 50B is configured to detect the wavelength range of 901 nm to 1650 nm. Specifically, the digital micromirror device 52A and the digital micromirror device 52B each have a plurality of micromirror units in an array, for example, and the micromirror units are arranged in N rows, for example, wherein N is an integer greater than 0, wherein a portion of the illumination light waveband of the first measurement beam L2A selected by the digital micromirror device 52A of the first spectrum measurement device 50A is a plurality of odd-numbered wavelength values. For example, the digital micromirror device 52A of the first spectrum measurement device 50A only turns on the odd rows of micromirror units 52A-1, 3, 5, 7 . . . . N−1 to detect odd-numbered wavelength values such as 901 nm, 903 nm . . . in the wavelength range of 901 nm to 1650 nm. The portion in the illumination light waveband of the second measurement beam L2B selected by the digital micromirror device 52B of the second spectrum measurement device 50B is a plurality of even-numbered wavelength values. For example, the digital micromirror device 52B of the second spectrum measurement device 50B only turns on the even rows of micromirror units 52B-2, 4, 6, 8 . . . . N to detect even-numbered wavelength values such as 902 nm, 904 nm . . . in the wavelength range of 901 nm to 1650 nm. Therefore, by using the first spectrum measurement device 50A and the second spectrum measurement device 50B to respectively measure the same wavelength range (such as 901 nm to 1650 nm) but different wavelength values (such as odd-numbered wavelength values and even-numbered wavelength values), synchronous scanning of the two may speed up the spectral sampling speed and reduce the time the sample is irradiated by the light source.

Figure 1C:
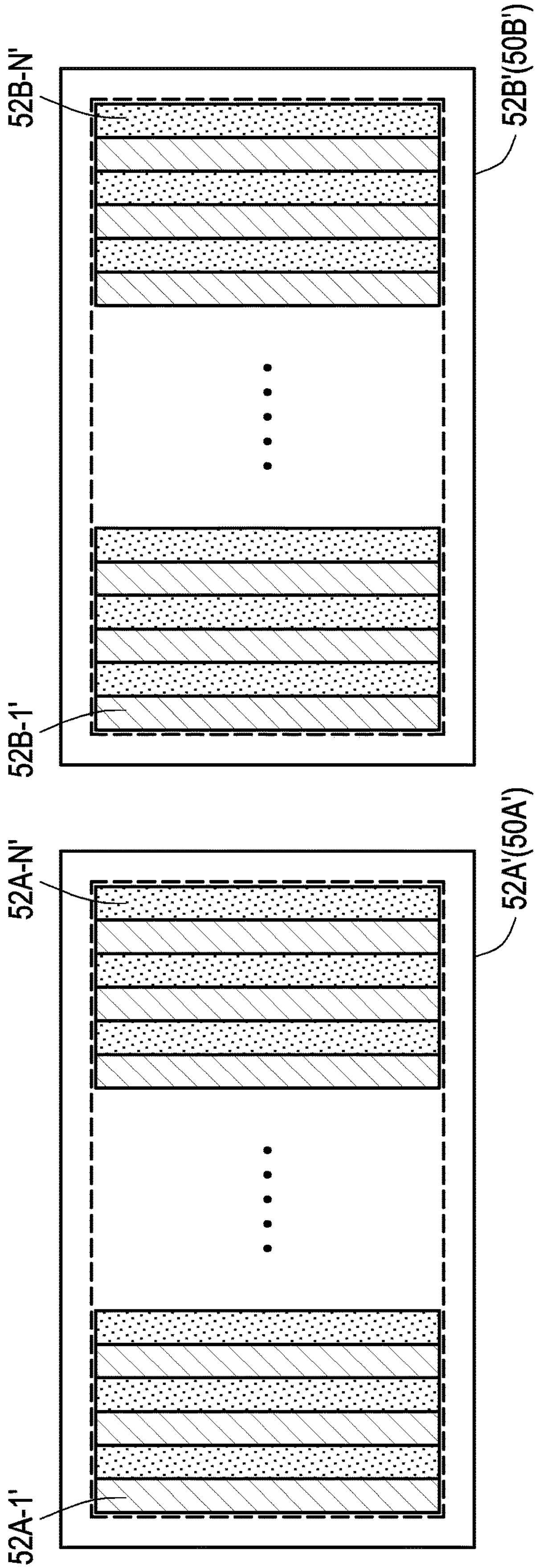
FIG. 1C is a schematic diagram of another wavelength selection embodiment of the digital micromirror device of the first spectrum measurement device and the digital micromirror device of the second spectrum measurement device in FIG. 1A.

FIG. 1C is a schematic diagram of another wavelength selection embodiment of a digital micromirror device of the first spectrum measurement device and a digital micromirror device of the second spectrum measurement device in FIG. 1A. As shown in FIG. 1A and FIG. 1C, in an embodiment, a first spectrum measurement device 50A' and a second spectrum measurement device 50B' may be different spectrum measurement devices. For example, the first spectrum measurement device 50A' includes a digital micromirror device 52A' configured to detect the wavelength range of 900 nm to 1650 nm. The second spectrum measurement device 50B' includes the same digital micromirror device 52B' as the first spectrum measurement device 50A' configured to detect the wavelength range of 1650 nm to 2400 nm. Specifically, the first spectrum measurement device 50A' and the second spectrum measurement device 50B' also include other optical elements (not shown) inside. When the first measurement beam L2A having the illumination light waveband enters the first spectrum measurement device 50A', the internal optical elements thereof transmit the first measurement beam L2A having a portion of the illumination light waveband to the digital micromirror device 52A', and the portion of the illumination light waveband is, for example, in the wavelength range of 900 nm to 1650 nm. When the second measurement beam L2B having the illumination light waveband enters the second spectrum measurement device 50B', the internal optical elements thereof transmit the second measurement beam L2B having another portion of the illumination light waveband to the digital micromirror device 52B', and the other portion of the illumination light waveband is, for example, in the wavelength range of 1650 nm to 2400 nm. The digital micromirror device 52A' and the digital micromirror device 52B' both have, for example, a plurality of micromirror units in an array, and the micromirror units are arranged in N rows, for example, wherein N is an integer greater than 0, wherein the digital micromirror device 52A' of the first spectrum measurement device 50A' turns on N rows of micromirror units 52A-1', 2', 3', 4', 5' . . . . N' to detect the first measurement beam L2A (the portion of the first measurement beam L2A having the illumination light waveband) in the wavelength range 900 nm to 1650 nm. The digital micromirror device 52B' of the second spectrum measurement device 50B' turns on N rows of micromirror units 52B-1', 2', 3', 4', 5' . . . . N' to detect the second measurement beam L2B (the second measurement beam L2B having the other portion of the illumination light waveband) having a wavelength range of 1650 nm to 2400 nm. Therefore, by using the first spectrum measurement device 50A' and the second spectrum measurement device 50B' to respectively detect measurement beams in different wavelength ranges (such as 900 nm to 1650 nm and 1650 nm to 2400 nm), synchronous scanning of the two may speed up the spectral sampling speed and reduce the time the sample is irradiated by the light source.

In other embodiments, when the first spectrum measurement device 50A and the second spectrum measurement device 50B are the same spectrum measurement device, for example, both are digital micromirror devices, the wavelength detection ranges of both the first spectrum measurement device 50A and the second spectrum measurement device 50B may be limited according to actual needs, and the disclosure is not limited thereto.

The detecting system 1 further includes at least two connecting devices connected between the spectrum measurement devices and the sampling module. In some embodiments, the number of the connecting devices is a plurality, and the number of the connecting devices is the same as the number of the spectrum measurement devices, so that a plurality of measurement beams are respectively introduced into different spectrum measurement devices. In the present embodiment, the connecting devices include a first connecting device 160A and a second connecting device 160B. The first connecting device 160A is connected between the first spectrum measurement device 50A and the sampling module 100, and the second connecting device 160B is connected between the second spectrum measurement device 50B and the sampling module 100. More specifically, the two ends of the first connecting device 160A are respectively connected to the first spectrum measurement device 50A and the corresponding light receiving module 130 thereof, and the two ends of the second connecting device 160B are respectively connected to the second spectrum measurement device 50B and the corresponding light receiving module 130 thereof.

In the present embodiment, the first connecting device 160A and the second connecting device 160B are optical fibers respectively. The length of the optical fibers is greater than or equal to 30 mm, and it is preferred to use an optical fiber having a length of 30 mm to 150 mm. Using optical fiber to transmit a signal may transmit an optical signal with high efficiency. By using relatively shorter optical fiber, the loss during signal transmission may be effectively reduced and the size of the detecting system may be reduced.

In some embodiments, the optical fiber used by the first connecting device 160A and the second connecting device 160B is a single-core optical fiber, and the optical fiber diameter of the optical fiber is 600 μm to 1000 μm. In some other embodiments, the optical fiber used by the first connecting device 160A and the second connecting device 160B is a circular-to-linear optical fiber bundle. The optical fiber bundle includes three optical fiber cores, and the diameter of the optical fiber cores is 600 μm. In another embodiment, the optical fiber used by the first connecting device 160A and the second connecting device 160B is a circular-to-linear optical fiber bundle. The optical fiber bundle includes seven optical fiber cores, and the diameter of the optical fiber cores is 200 μm.

Figure 2:
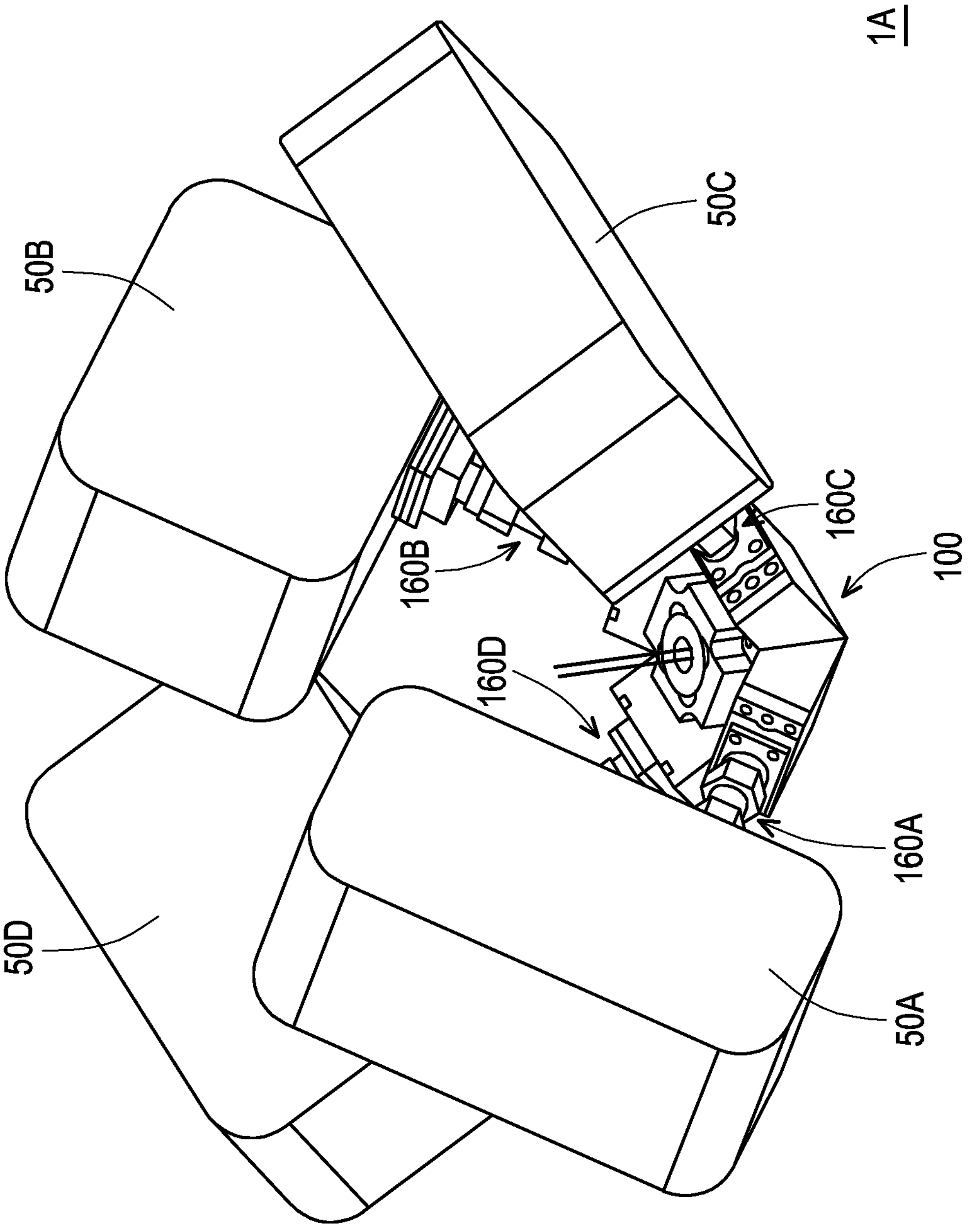
FIG. 2 is a perspective view of a detecting system using a spectrum measurement device according to another embodiment of the invention.

FIG. 2 is a perspective view of a detecting system according to another embodiment of the invention. In the present embodiment, a detecting system 1A is similar to the detecting system 1 shown in FIG. 1. The difference is that the detecting system 1A has four spectrum measurement devices: the first spectrum measurement device 50A, the second spectrum measurement device 50B, the third spectrum measurement device 50C, and the fourth spectrum measurement device 50D are connected to the sampling module 100 respectively via the first connecting device 160A, the second connecting device 160B, the third connecting device 160C, and the fourth connecting device 160D. The first spectrum measurement device 50A, the second spectrum measurement device 50B, the third spectrum measurement device 50C, and the fourth spectrum measurement device 50D are similar to the first spectrum measurement device 50A and the second spectrum measurement device 50B of FIG. 1 and are not repeated here. The first connecting device 160A, the second connecting device 160B, the third connecting device 160C, and the fourth connecting device 160D are similar to the first connecting device 160A and the second connecting device 160B of FIG. 1 and are not repeated here. In the present embodiment, the first spectrum measurement device 50A, the second spectrum measurement device 50B, the third spectrum measurement device 50C, and the fourth spectrum measurement device 50D are symmetrically distributed on the sampling module 100. At least one of the first spectrum measurement device 50A, the second spectrum measurement device 50B, the third spectrum measurement device 50C, and the fourth spectrum measurement device 50D is provided with a digital micromirror device, which serves as a wavelength selector. By using a plurality of spectral measurement devices (four), sample absorption spectrum information of different regions of large-diameter heterogeneous samples may be rapidly obtained.

Figure 3B:
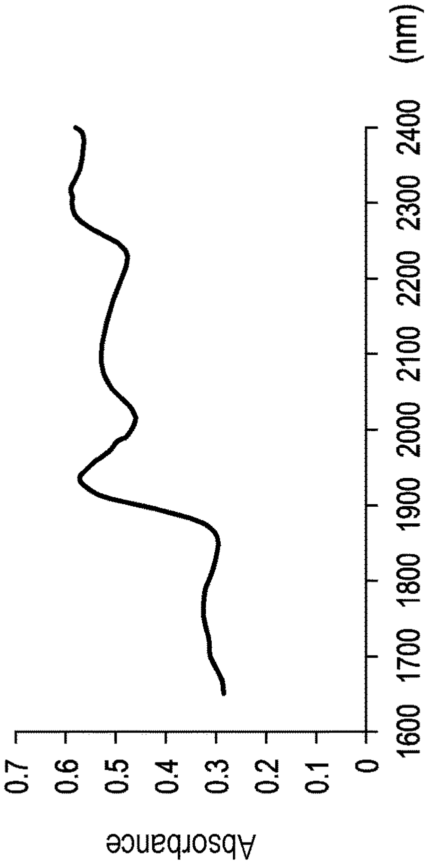
FIG. 3A to FIG. 3C are schematic diagrams of detection results of a detecting system using a spectrum measurement device according to an embodiment of the invention.
Figure 3A:
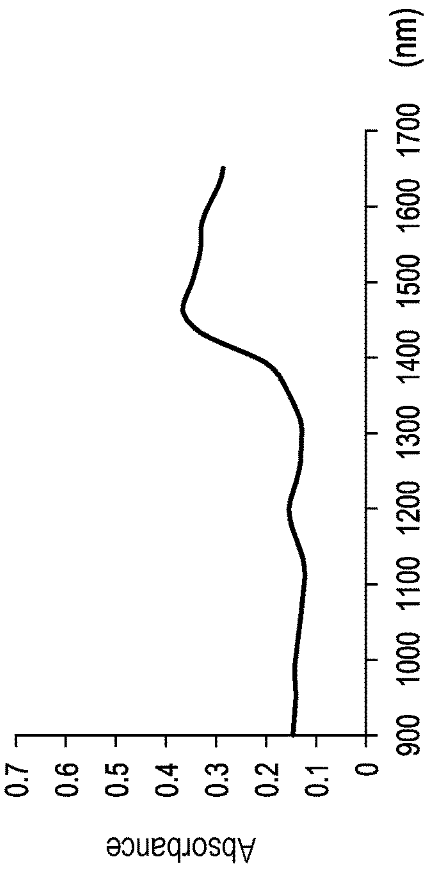
Figure 3C:
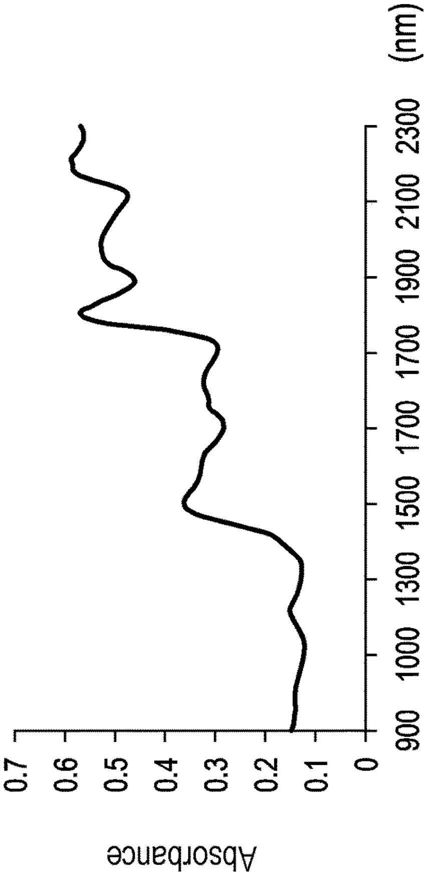

FIG. 3A to FIG. 3C are schematic diagrams of detection results of a detecting system according to an embodiment of the invention. FIG. 3A and FIG. 3B are spectra measured by the detecting system shown in FIG. 1. The detecting system 1 includes the first spectrum measurement device 50A and the second spectrum measurement device 50B. The first spectrum measurement device 50A and the second spectrum measurement device 50B are respectively connected to the sampling module 100 via the first connecting device 160A and the second connecting device 160B, that is, short optical fibers having a length of 35 mm. The illumination beam L1 of the illumination module 110 of the sampling module 100 irradiates the object 10 to be measured, the diffusely reflected light of the object 10 to be measured is then transmitted into the first spectrum measurement device 50A and the second spectrum measurement device 50B via the light receiving module 130 of the sampling module 100, the measurement beams are obtained at the same time, and the sample absorption spectra in different wavelength ranges are measured separately. FIG. 3A shows the absorption spectrum measured by the first spectrum measurement device 50A. The wavelength range is 900 nm to 1650 nm, and the vertical axis is absorbance. FIG. 3B shows the absorption spectrum measured by the second spectrum measurement device 50B. The wavelength range is 1650 nm to 2400 nm, and the vertical axis is absorbance. FIG. 3C shows the absorption spectrum measured by the first spectrum measurement device 50A and the absorption spectrum measured by the second spectrum measurement device 50B integrated into a complete sample absorption spectrum with a wavelength range of 900 nm to 2400 nm. By using two spectral measurement devices, different wavelength ranges of the sample may be measured simultaneously without excessive heating or temperature rise of the sample. The measurement range and measurement efficiency are effectively increased. In particular, absorbance is defined as log 10(1/R), and R is the reflectance, which is the ratio between the diffusely reflected light (measurement light) of the object and the illumination beam.

Based on the above, the detecting system of the invention uses two or more spectrum measurement devices, and at least one of the spectrum measurement devices uses a DMD chip (digital micromirror device) and is connected to the same sampling module via a short optical fiber, such that the sample absorption spectrum information of different regions of a large-diameter heterogeneous sample may be rapidly obtained. At the same time, the space volume of the detecting system is reduced. Moreover, by integrating two or more spectrum measurement devices having a small wavelength range into one spectrum measurement device having a large wavelength range, the large-size wavelength selection chip needed for a large wavelength range spectrometer may be avoided, thus saving production costs. Moreover, by using two or more spectral measurement devices having the same wavelength range, spectra in the same wavelength range may be rapidly obtained to reduce the time for the light source to irradiate the sample and obtain the spectral information of the sample in a short time.

However, the above are only preferred embodiments of the invention, and should not be used to limit the scope of the invention. That is, all simple equivalent changes and modifications made based on the patentable scope and invention description of the invention are still within the scope of the patent of the invention. In addition, any embodiment or patentable scope of the invention does not need to achieve all the objects, advantages or features disclosed in the invention. In addition, the abstract section and title are only used to assist in searching patent documents and are not intended to limit the scope of the invention. Moreover, terms such as "first" and "second" mentioned in this specification or the claims are only used to name elements or distinguish different embodiments or scopes, and are not used to limit the upper limit or lower limit on the number of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A detecting system using spectrum measurement devices and configured to detect an object, wherein the detecting system comprises: a sampling module and at least two spectrum measurement devices assembled to the sampling module, wherein the sampling module is configured to provide an illumination beam to the object and to collect at least two measurement beams reflected by the object to the at least two spectrum measurement devices, wherein the illumination beam has an illumination light waveband, and the at least two measurement beams have the illumination light waveband;

the at least two spectrum measurement devices comprise a first spectrum measurement device and a second spectrum measurement device, the first spectrum measurement device comprises a digital micromirror device, and the at least two measurement beams comprise a first measurement beam transmitted to the first spectrum measurement device and a second measurement beam transmitted to the second spectrum measurement device, wherein the first spectrum measurement device is configured to detect a portion of the illumination light waveband of the first measurement beam, and at the same time, the second spectrum measurement device is configured to detect another portion of the illumination light waveband of the second measurement beam, wherein the second spectrum measurement device comprises another digital micromirror device, the another digital micromirror device of the second spectrum measurement device is the same as the digital micromirror device of the first spectrum measurement device, the first spectrum measurement device is configured to detect the portion of the illumination light waveband of the first measurement beam selected by the digital micromirror device, and the second spectrum measurement device is configured to detect the other portion of the illumination light waveband of the second measurement beam selected by the another digital micromirror device, wherein the portion of the illumination light waveband of the first measurement beam and the other portion of the illumination light waveband of the second measurement beam are different wavebands or different wavelength values, wherein the portion of the illumination light waveband of the first measurement beam selected by the digital micromirror device of the first spectrum measurement device has a plurality of odd-numbered wavelength values, and the other portion in the illumination light waveband of the second measurement beam selected by the another digital micromirror device of the second spectrum measurement device has a plurality of even-numbered wavelength values.

2. The detecting system using the spectrum measurement device according to claim 1, wherein a number of the at least two spectrum measurement devices is a plurality, a number of the at least two measurement beams is a plurality, and the plurality of spectrum measurement devices are configured to receive the plurality of measurement beams respectively and detect different portions in the illumination light wavebands of the plurality of measurement beams simultaneously.

3. The detecting system using the spectrum measurement device according to claim 1, wherein after the first spectrum measurement device receives the first measurement beam, only the portion of the illumination light waveband of the first measurement beam is transmitted to the digital micromirror device of the first spectrum measurement device, and after the second spectrum measurement device receives the second measurement beam, only the other portion of the illumination light waveband of the second measurement beam is transmitted to the digital micromirror device of the second spectrum measurement device, wherein the portion of the illumination light waveband and the other portion of the illumination light waveband are different wavebands.

4. The detecting system using the spectrum measurement device according to claim 1, wherein the detecting system further comprises at least two connecting devices, the at least two connecting devices comprise a first connecting device and a second connecting device, the first connecting device is connected between the first spectrum measurement device and the sampling module, and the second connecting device is connected between the second spectrum measurement device and the sampling module.

5. The detecting system using the spectrum measurement device according to claim 4, wherein the at least two connecting devices are optical fibers respectively, and a length of each of the optical fibers is greater than or equal to 30 mm.

6. The detecting system using the spectrum measurement device according to claim 5, wherein each of the optical fibers is a single-core optical fiber, and an optical fiber diameter of each of the optical fibers ranges from 600 μm to 1000 μm.

7. The detecting system using the spectrum measurement device according to claim 5, wherein each of the optical fibers is a circular-to-linear optical fiber bundle, the circular-to-linear optical fiber bundles comprise three optical fiber cores, and a diameter of each of the three optical fiber cores is 600 μm.

8. The detecting system using the spectrum measurement device according to claim 5, wherein each of the optical fibers is a circular-to-linear optical fiber bundle, the circular-to-linear optical fiber bundles comprise seven optical fiber cores, and a diameter of each of the seven optical fiber cores is 200 μm.

9. The detecting system using the spectrum measurement device according to claim 1, wherein a number of the at least two spectrum measurement devices is a plurality, and the plurality of spectrum measurement devices are symmetrically distributed on the sampling module.

10. The detecting system using the spectrum measurement device according to claim 1, wherein a distance between the sampling module and the object is greater than 0 mm.

11. The detecting system using the spectrum measurement device according to claim 1, wherein the sampling module comprises: at least one illumination module, a light collecting element, and at least two light receiving modules, wherein the at least one illumination module provides the illumination beam;

the light collecting element has a first opening and an internal space, the at least one illumination module is disposed in the first opening, and the illumination beam is transmitted to the object in the internal space; and the at least two light receiving modules are connected to the light collecting element, and each of the at least two light receiving modules comprises a housing and a lens element group disposed in the housing, wherein a distance between the sampling module and the object is greater than 0 mm, and the two measurement beams are transmitted from the object via the lens element group to enter the at least two spectrum measurement devices.

12. The detecting system using the spectrum measurement device according to claim 11, wherein the at least one illumination module comprises a light-emitting element, a cup-shaped reflector, and a base, the base is disposed at a top of the light collecting element, the base has a second opening, the cup-shaped reflector is disposed in the second opening, the cup-shaped reflector has a third opening, the light-emitting element is disposed in the third opening, and the light-emitting element is configured to provide the illumination beam.

13. The detecting system using the spectrum measurement device according to claim 12, wherein an optical axis of the light-emitting element is coaxial with a central axis of the cup-shaped reflector.

14. The detecting system using the spectrum measurement device according to claim 12, wherein the light collecting element is a hollow cylindrical shell, and an inner wall of the light collecting element is a smooth reflective surface.

15. The detecting system using the spectrum measurement device according to claim 11, wherein an inner wall of the housing of each of the at least two light receiving modules is a light-absorbing surface, and an absorbance is greater than or equal to 2.

16. The detecting system using the spectrum measurement device according to claim 11, wherein the lens element group comprises a first lens element and a second lens element, the first lens element is located between the second lens element and the light collecting element, the first lens element is a meniscus lens element, and the second lens element is a biconvex lens element.

17. The detecting system using the spectrum measurement device according to claim 11, wherein there is an angle between an extension axis of each of the at least two light receiving modules and an extension axis of the light collecting element, and the angle is greater than or equal to 25 degrees and less than or equal to 65 degrees.

18. The detecting system using the spectrum measurement device according to claim 11, wherein a number of the at least two light receiving modules is the same as a number of the at least two spectrum measurement devices.

* * * * *